Patented June 13, 1944

2,351,195

UNITED STATES PATENT OFFICE 2,351,195

FINGERNAIL ENAMEL REMOVER COMPOSITION

Alfred Dreyling, South River, N. J., assignor to E. I. du Pont de Nemours & Company, Wilmington, Del., a corporation of Delaware No Drawing. Application December 12, 1940, Serial No. 369,757

7 Claims. (Cl. 252—119)

This invention relates to a method for preparing non-flowing creams from organic liquids, and more particularly to creams formed in the presence of high concentrations of active nitrocellulose solvents.

The softening or removal of dried films of lacquers and enamels, particularly those based upon nitrocellulose, has heretofore been commonly carried out by the application of liquid organic solvents. The high fluidity of these solvents, while permitting simple application methods such as brushing or swabbing, becomes a serious disadvantage in many cases as the liquid runs freely over the object and often causes serious marring of adjoining areas. Also, drippings from the surface treated to other painted, lacquered or varnished objects will cause bad marring due to the powerful solvent action of these liquids.

It has been found possible to overcome these disadvantages by bodying up the solvents to form a creamy, non-flowing consistency. This has been accomplished heretofore by incorporating relatively large proportions of waxes, assisted in certain cases by the presence of soaps and water. The waxes normally chosen are those incompletely soluble in the organic liquids at room temperatures at the concentrations used. These products, while originally of a creamy consistency which permits handling without spillage, have a number of serious defects including a degree of instability as shown by the gradual but definite separation of free liquid from the cream. Also, due to the high wax concentration, portions of the wax tend to remain on the surface of the object being cleaned, rendering recoating with lacquer difficult and greatly reducing adhesion of subsequent coats of enamel. When paraffin waxes are used and are incompletely removed, a serious retardation of the drying of the new lacquer coating will frequently occur. The high concentration of waxes required has a tendency to reduce the solvent power of the compositions formed. These creams also tend to become fluid during hot weather and to crystallize in cold weather.

This invention has as an object the production of a cream-like product having present high concentrations of active nitrocellulose solvents. A further object is the production of a product resistant to serious consistency changes up to a temperature of approximately 125° F. or slightly higher and a product resistant to crystallization at low temperatures. An object is a method for preparing stable creams in the absence of natural or synthetic waxes. A still further object is a method of preparing products having a stiff creamy consistency characterized by their ability to quickly wet and thoroughly soften dried films of lacquer compositions and by a pronounced tendency of the cream to cohere or retain its body during application; by the ease with which they can be removed from the object together with all traces of the lacquer film; and by their resistance to the sweating out of free solvent on storage or during application.

These objects are accomplished by the following invention. The viscosity of a solution comprising active substantially anhydrous nitrocellulose solvent or solvents, castor oil or its equivalent, and stearic or palmitic acid, is increased by the addition of a small amount of a soluble, high viscosity ethyl cellulose, following which step sufficient concentrated ammonia water (27–29% concentration by weight) is added slowly and with moderate stirring to allow reaction with at least part of the stearic or palmitic acid. A cream is immediately formed, the solidity and coherence of which is a function of the amount of ammonia water added.

The compositions formed are particularly adapted for use as removers for nail polish enamels of the nitrocellulose type, and are characterized by a type of creaminess which has not been hitherto obtained. In order to obtain satisfactory stability on storage and what might be described as a toughness or coherence of the cream, it is necessary to carefully balance the ingredients. The presence of the ethyl cellulose contributes largely to the body and toughness of the cream formed, while the reaction product of ammonia and stearic acid in the presence of the small amount of water introduced by the ammonia water contributes principally to a high degree of plasticity and easy working qualities of the cream.

Example 1

| | Parts |
|---|---|
| Ethyl acetate (99%) | 40.0 |
| n-Butyl acetate | 40.0 |
| Castor oil | 4.0 |
| Perfume | 0.1 |
| Ethyl cellulose (60–80 sec.[1]) | 2.8 |
| Stearic acid | 11.0 |

[1] The viscosity of a 20% solution of ethyl cellulose dissolved in an 80–20 mixture of toluene—95% ethyl alcohol and the viscosity determination carried out by A. S. T. M. method D–301–33.

The ingredients are blended together in any suitable vessel and either mixed at room temperature until complete solution of the ethyl cellulose and stearic acid has been obtained, or heated to approximately 50 to 60° C. to hasten the rate of solution. When the composition forms a clear liquid having a low, syrupy viscosity, the blending can be considered to be complete. At this point the product does not resemble a cream in any way. 3.8 parts of concentrated aqua ammonia (27–29%) are then slowly added to the clear solution and mild agitation is effected until all of the ammonia has been added. This addition immediately forms a smooth, creamy product which is characterized by extreme stability and superior working qualities. The product is particularly adapted to the removal of dried films of nitrocellulose finger nail enamels. Applied to a dry film of finger nail enamel and gently rubbed, rapid softening takes place and the remover plus the softened enamel can be wiped from the nail without difficulty. Subsequent coatings of fresh finger nail enamel to the nail have been found to show excellent adhesion, indicating freedom from any undesirable residual film. The product has a non-volatile content of approximately 18.9% by weight.

Example 2

| | Parts |
|---|---|
| Methyl ethyl ketone | 83.0 |
| Castor oil | 10.0 |
| Perfume | 0.1 |
| Ethyl cellulose (60–80 sec.) | 3.5 |
| Stearic acid | 10.0 |

The above ingredients are blended and stirred until complete solution has been secured. As in the case of Example 1, a clear solution of a low, syrupy viscosity is secured at this point. Four parts of aqua ammonia (27–29%) are then slowly added with mild agitation and a smooth, creamy product is quickly produced which on testing will be found to have excellent stability and working properties. The product, while particularly adapted to the removal of nitrocellulose enamel films, can be utilized in removing other lacquer films based on cellulose acetate or ethyl cellulose, and is also very effective in softening paint and varnish films. The product has a non-volatile content of 24.6% by weight.

Example 3

| | Parts |
|---|---|
| Ethyl acetate (99%) | 83.0 |
| Ethyl cellulose (60–80 sec.) | 3.0 |
| Stearic acid | 10.0 |

These ingredients are blended and mixed until a clear solution is obtained. 4.3 parts of aqua ammonia (27–29%) are then slowly added with continued stirring and a stiff, creamy product is obtained. The product has a non-volatile content of 14.2% by weight. This product has been found to be slightly inferior in smoothness and working characteristics to the products of Examples 1 and 2. The difference can be attributed to the elimination of castor oil from the formula. The presence of castor oil serves several purposes. First, as disclosed in Bishop U. S. Patent 2,032,042, the presence of castor oil in a nail polish remover tends to avoid complete removal of oily matter from the nails and, second, in the present compositions the castor oil contributes to the smoothness of the cream formed. A further function of the castor oil in the present compositions is that in the range of concentrations suggested, the castor oil tends to prevent the formation of a hard, white cake on the surface being cleaned if the cream is allowed to dry out. In the presence of the castor oil, a soft, readily removable residue is deposited. It has been found possible to substitute certain other cosmetic aids for the castor oil, for example, olive oil or lanolin, provided that the composition is rebalanced to give a cream of the desired toughness and smoothness.

The quantity of aqua ammonia (27–29%) added in the case of Example 3 has been found to be more than is actually necessary, and while it is possible to obtain practical products at this and even at slightly higher concentrations, it is desirable in any case to limit the quantity of ammonia used to that not more than is required to theoretically completely react with the stearic acid present. I have found, however, that my most satisfactory products are obtained when the ratio of stearic acid to concentrated aqua ammonia is approximately 10 to 3.5.

The solvent compositions suitable for my purpose are characterized principally by their solvent power for the dry lacquer films, and by their freedom from water. I found it advantageous to avoid the use of appreciable quantities of water soluble organic liquids, particularly ethyl alcohol. The presence of substantial quantities of either ethyl acetate or methyl ethyl ketone has been found to be advantageous in that these highly volatile solvents act upon dry lacquer films with great rapidity. In instances where these solvents prove to be too volatile, higher boiling solvents such as isopropyl acetate, n-butyl acetate, amyl acetate and similar esters may be used. Diluents such as toluene or gasoline may be used in minor amounts. I prefer to have an active nitrocellulose solvent concentration of at least 70% by weight, and in some cases a satisfactorily stabilized cream can be produced with 85% or even more active solvent.

An important and critical part of my invention lies in the balance existing between the ratios of ethyl cellulose to stearic acid to ammonia to water. Alone, ethyl cellulose merely forms viscous solutions dependent upon the viscosity characteristic of the ethyl cellulose and the concentration in which it is used. I prefer to use an ethyl cellulose having a high viscosity characteristic in order to produce the requisite final viscosity effect with a minimum of ethyl cellulose. It was found that only when a careful balance had been worked out in the proportions could creams be produced having the required stability and uniformly smooth, creamy character. In addition to increasing the viscosity of the mixture, the presence of the ethyl cellulose is important and necessary in that it serves as a binder, so that the other non-volatile ingredients, castor oil, stearic acid and ammonium stearate, become components of a soft, pudgy film, rather than functioning as independent ingredients. The formation of this soft, pudgy film, as the active solvent disappears, greatly reduces the tendency of there being left on the object being cleaned traces of free stearic acid, ammonium stearate or castor oil. Experimental compositions in which ethyl cellulose was not combined and in which ammonia was allowed to act on stearic acid in the presence of the organic solvents, were found to have very grainy, non-uniform consistencies. The stability was also found to be relatively poor.

The ratio of 10 parts of stearic acid to 3.5 parts of aqua ammonia (27–29%) to 2.5 parts of high viscosity ethyl cellulose has been found to be approximately the optimum. When an ethyl cellulose of lower viscosity characteristic is used, it will be found necessary to increase the ratio of this material somewhat. This is not desirable because of the greater total solids content involved. In general, an increase in the ratio of the ethyl cellulose leads to stringiness of the cream and reduction of the ethyl cellulose ratio leads to an undesirable shortness and lack of toughness or coherence.

I have found that a cream containing approximately 10 parts by weight of stearic acid allows the use of high concentrations of active solvents and produces a cream of satisfactory stability and working properties. However, this actual percentage is not particularly critical. It is the ratio existing between the ethyl cellulose, stearic acid and concentrated aqua ammonia which is critical. Increase in the stearic acid ratio tends to produce a very granular cream and reduction in the stearic acid ratio leads to fluidity.

The water introduced in the form of the concentrated aqua ammonia (27-29%) has been found to be very important. It is necessary to have a small but controlled amount of water present in order to form the desired cream. As a result of my experimental work, I have found that in using substantially anhydrous solvents, the use of concentrated aqua ammonia (27-29%) brings into the composition approximately the correct amount of water to form a cream of the most desirable character.

I have found it to be impossible to prepare a satisfactory creamy product by the addition of previously reacted ammonium stearate. It is an important part of my process, therefore, to add the stearic acid and aqua ammonia during the manufacture of the product, so that the reaction occurs in the presence of the ethyl cellulose, the solvents, and the castor oil. Therefore, while my final composition may be considered to comprise in part ammonium stearate, the product cannot be prepared, as far as I am aware, by the addition of ammonium stearate to the remaining ingredients.

It will be seen, therefore, that my process differs substantially from previous cream type products.

I prefer to prepare my product by dissolving in the solvent mixture all of my ingredients to form a clear, slightly viscous solution excepting the requisite amount of concentrated aqua ammonia. On the addition of the ammonia water to this clear solution, with suitable stirring, a creamy, coherent product is obtained which is especially adapted for my purpose. I, therefore, prefer to use the ratio of 10 parts of stearic or palmitic acid to 3.5 parts of aqua ammonia (27-29%) to 2.5 parts of ethyl cellulose. The ratio of concentrated aqua ammonia to stearic acid may be varied between 2.0:10 and 4.6:10, and the consistency and general quality of the cream, while varying substantially over this range, all represent products superior in working characteristics to those previously described or used. The ratio of ethyl cellulose to the stearic acid may vary between 2:10 and 4:10 dependent both upon the viscosity characteristic of the ethyl cellulose used and the toughness or coherence of the cream produced. The castor oil assists greatly when present in the ratios between 2:10 and 10:10, with 4:10 representing approximately the optimum.

The advantages of the compositions of the present invention are several. The new creams possess a powerful solvent action, so that lacquers, enamels, paints and varnishes are quickly and completely softened and removed from surfaces, leaving the surfaces in excellent condition for recoating. In case of the use as nail polish enamel removers, embrittlement of the nail and harmful drying effects on the adjoining skin are avoided. The creamy consistency of the products avoid the spillage and waste normally connected with the use of a liquid type remover. The improved characteristics of my compositions, especially when they are being worked into the dry coatings, are such that at no stage of the operation does there exist a highly fluid phase which would tend to run from the surface. The creamy character of the composition is also an aid in that it prevents too-rapid evaporation of the volatile solvents. The compositions are stable for long periods of time and, in particular, will withstand temperatures up to 125° F. or slightly higher without appreciably losing their coherent, creamy character. The compositions are further characterized by their relatively low non-volatile content which permits the presence of high percentages of highly active solvents and materially increases their effectiveness. The creamy character of the compositions approximates the working characteristics of the cold creams with which every user of cosmetics is familiar.

It is apparent that many widely different embodiments of the invention may be made without departing from the spirit and scope thereof; and, therefore, it is not intended to be limited except as indicated in the appended claims.

I claim:

1. A finger nail enamel remover composition in cream-like form consisting of at least about 75% by weight of a fluid substantially anhydrous organic solvent portion capable of dissolving nitrocellulose, the remainder comprising a mixture in the ratios by weight of 10 parts of a solid fatty acid from the group consisting of stearic and palmitic acids, 2 to 4 parts of ethyl cellulose, 2 to 10 parts of a cosmetic aid from the group consisting of castor oil, olive oil and lanolin, and 2 to 4.6 parts of concentrated aqua ammonia.

2. The composition of claim 5 wherein the fluid substantially anhydrous organic solvent portion consists of ethyl acetate.

3. The composition of claim 5 wherein the fluid substantially anhydrous organic solvent portion consists of a mixture of ethyl acetate and butyl acetate.

4. The composition of claim 5 wherein the fluid substantially anhydrous organic solvent portion consists of a mixture of active nitrocellulose solvent and diluent.

5. A finger nail enamel remover composition in cream-like form consisting of at least about 75% by weight of a fluid substantially anhydrous organic solvent portion capable of dissolving nitrocellulose, the remainder comprising a mixture in the ratios by weight of about 10 parts of a solid fatty acid from the group consisting of stearic and palmitic acids, 2.5 parts of ethyl cellulose, 4.0 parts of a cosmetic aid from the group consisting of castor oil, olive oil and lanolin, and 3.5 parts of concentrated aqua ammonia.

6. The composition of claim 5 wherein the fluid substantially anhydrous organic solvent portion consists of a mixture of ethyl acetate and butyl acetate.

7. A cream type finger nail enamel remover comprising by weight

| | Parts |
|---|---|
| Ethyl acetate | 40.0 |
| n-Butyl acetate | 40.0 |
| Castor oil | 4.0 |
| Perfume | 0.1 |
| Ethyl cellulose | 2.8 |
| Stearic acid | 11.0 |
| Concentrated ammonium hydroxide | 3.8 |

ALFRED DREYLING.

CERTIFICATE OF CORRECTION.

Patent No. 2,351,195.　　　　　　　　　　　　　　　　　　June 13, 1944.

ALFRED DREYLING.

It is hereby certified that error appears in the printed specification of the above numbered patent requiring correction as follows: Page 3, second column, lines 36, 39 and 43, for the claim reference numeral "5" read --1--; and that the said Letters Patent should be read with this correction therein that the same may conform to the record of the case in the Patent Office.

Signed and sealed this 29th day of August, A. D. 1944.

Leslie Frazer (Seal)　　　　　　　　　　　　　　　Acting Commissioner of Patents.